(12) United States Patent
Bruno et al.

(10) Patent No.: US 6,226,529 B1
(45) Date of Patent: May 1, 2001

(54) SYSTEM FOR PROVIDING A SIMULTANEOUS DATA AND VOICE CHANNEL WITHIN A SINGLE CHANNEL OF A PORTABLE CELLULAR TELEPHONE TO PROVIDE POSITION-ENHANCED CELLULAR SERVICES (PECS)

(75) Inventors: Ronald Bruno, Arlington, VA (US); Leonard Schuchman, Potomac, MD (US); Kenneth Cunningham, Hamilton; Robert McCarthy, Arlington, both of VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/352,312

(22) Filed: Dec. 8, 1994

(51) Int. Cl.[7] ................... H04Q 7/20; H04J 1/02
(52) U.S. Cl. .............. 455/557; 455/550; 455/569; 455/575; 370/493; 370/494; 370/495
(58) Field of Search .................. 379/58, 59, 60, 379/61, 63; 455/33.1, 550, 557, 569, 575; 370/110.4, 111, 118, 493, 494, 495, 527, 528, 529

(56) References Cited

U.S. PATENT DOCUMENTS

| | | | |
|---|---|---|---|
| 4,881,259 | * | 11/1989 | Scordato ............... 379/58 |
| 5,081,667 | * | 1/1992 | Drori et al. ............ 379/59 |
| 5,235,633 | * | 8/1993 | Dennison et al. ..... 379/60 |
| 5,367,558 | * | 11/1994 | Gillig et al. ........... 379/59 |
| 5,410,541 | * | 4/1995 | Hotto .................... 370/76 |
| 5,450,471 | * | 9/1995 | Hanawa et al. ....... 379/58 |
| 5,479,479 | * | 12/1995 | Braitberg et al. ..... 379/58 |
| 5,568,535 | * | 10/1996 | Sheffer et al. ......... 379/39 |
| 5,577,066 | * | 11/1996 | Schuchman et al. ... 375/222 |

FOREIGN PATENT DOCUMENTS

WO 90/13196 * 11/1990 (WO).

* cited by examiner

Primary Examiner—Nay Maung
(74) Attorney, Agent, or Firm—Jim Zegeer

(57) ABSTRACT

An accessory device for portable telephones which provides simultaneous functionality of a hands-free accessory device and a data-in-voice modem enabling a portable telephone to be used in a vehicle such that the driver can be engaged in a hands-free conversation at the same time as data (such as GPS position information) is being sent over the same cellular voice channel.

10 Claims, 4 Drawing Sheets

SYSTEM FOR PROVIDING A SIMULTANEOUS DATA AND VOICE CHANNEL WITHIN A SINGLE CHANNEL OF A PORTABLE CELLULAR TELEPHONE TO PROVIDE POSITION-ENHANCED CELLULAR SERVICES (PECS)

REFERENCE TO RELATED APPLICATIONS:

This application is related to the following: U.S. application Ser. No. 07/992,892, filed Dec. 17, 1992; U.S. application Ser. No. 08/079,810, filed Jun. 22, 1993; U.S. application Ser. No. 08/115,087, filed Sep. 2, 1993; and U.S. application Ser. No. 08/203,257, filed Mar. 1, 1994, all of which are incorporated herein by reference.

BACKGROUND AND BRIEF DESCRIPTION OF THE INVENTION:

Most modern portable cellular telephones have ports embedded within them that connect to some or all of the telephone's audio, data, power and RF lines. FIG. 1 illustrates two typical configurations for portable phones. Access to the audio lines of a portable enable these lines to be tapped in order to support a variety of accessory equipment such as modems or hands-free equipment. In all of these accessories, the audio transducers in the ear and mouth piece are disabled and replaced by audio inputs/outputs in the accessories. Thus in the case of a modem accessory, the transmit audio is the transmitted digital signal generated by the modem, and the received audio is routed to the modem for demodulation of the digital data stream. In the case of hands-free accessories, the audio functions of the ear and mouth piece are supplied by the external speaker and microphone, respectively of the hands-free accessory kit. Some portable phones also provide access to the portable RF output via a connector as well. In such a case, when the RF connector is not tapped, the portable sends/receives RF signals via its antenna. However, when the RF port is tapped, the RF path to the antenna is blocked and all the RF is routed via the connector. In FIG. 1a, a portable is illustrated that contains a port that supports both the audio and RF lines. In this case, the use of an accessory device is illustrated in which the connector bifurcates, routing the RF to an alternative antenna, and routing the audio lines to the accessory device. In FIG. 1b, a portable is illustrated in which the RF lines are not tapped. In this case, the portable's antenna continues to be used, and all the outputs from the connector are routed to the accessory device. In addition to RF and audio, many portable phones also provide power inputs on an external port to provide operating power to portable and battery charging as well.

The object of this invention is to provide an accessory device for portable phones that provides the simultaneous functionality of a hands-free accessory device and a data-in-voice modem. Thus, with the use of this invention, a portable phone can be used in a vehicle such that the driver can be engaged in a hands-free conversation at the same time that data (such as position information) is being sent over the same cellular channel.

DESCRIPTION OF THE DRAWINGS:

The above and other objects, advantages and features of the invention will become more apparent when considered with the following specification and accompanying drawings wherein.

DETAILED DESCRIPTION OF THE INVENTION:

The present invention provides a system for achieving simultaneous data and voice channels within a single channel of a portable cellular telephone to provide position enhanced cellular services (PECS) to a user.

Figure 1B:
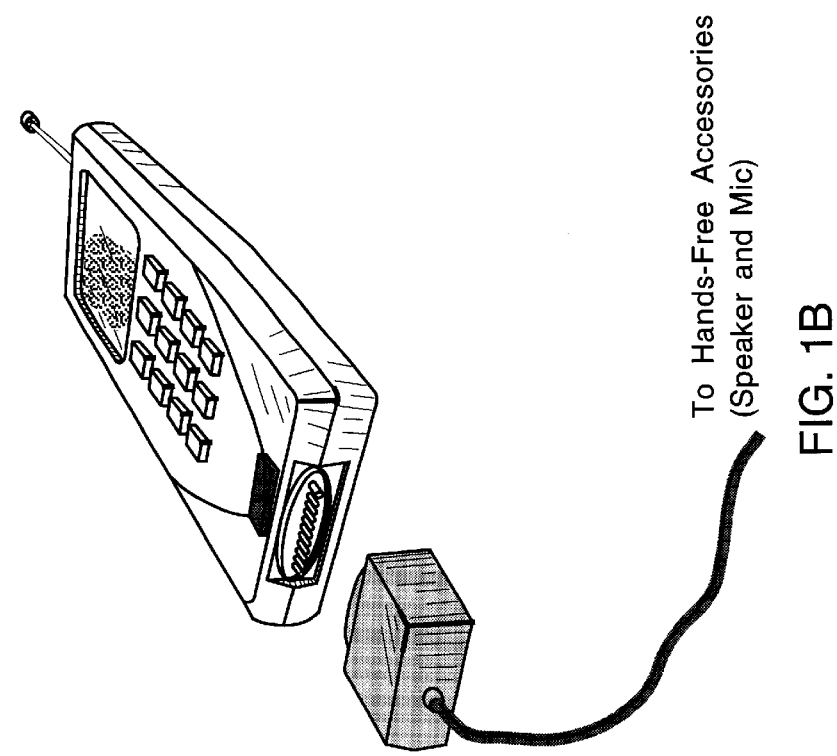
FIG. 1b illustrates a portable telephone having a port with both audio and RF lines.
Figure 1A:
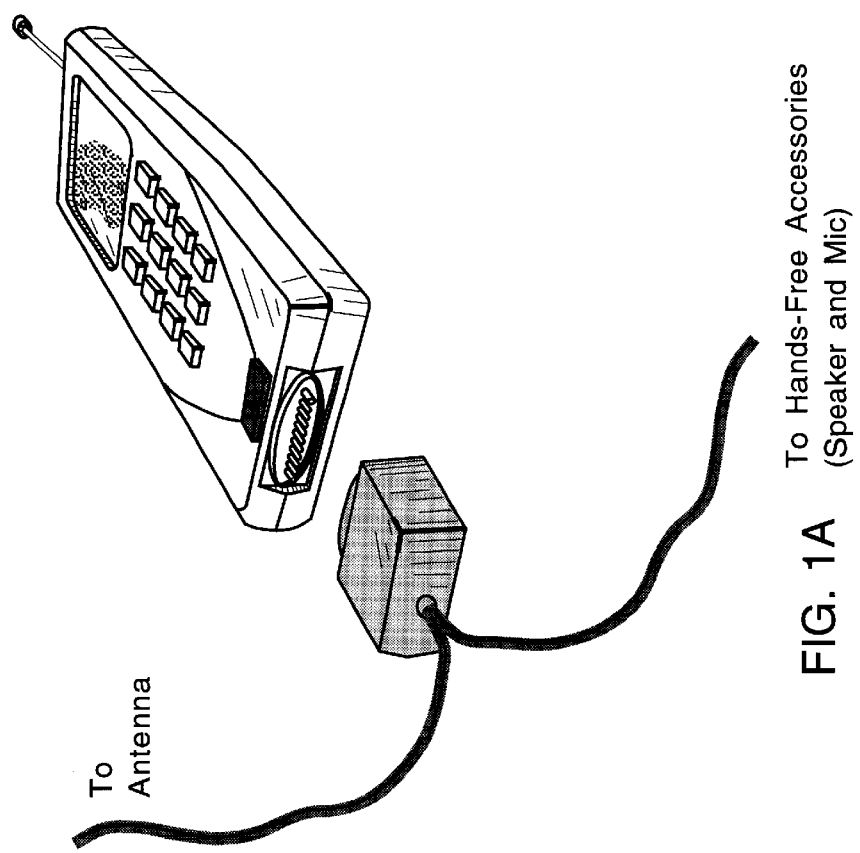
FIG. 1a is an isometric perspective view of two typical prior art configurations for portable telephones.
Figure 2A:
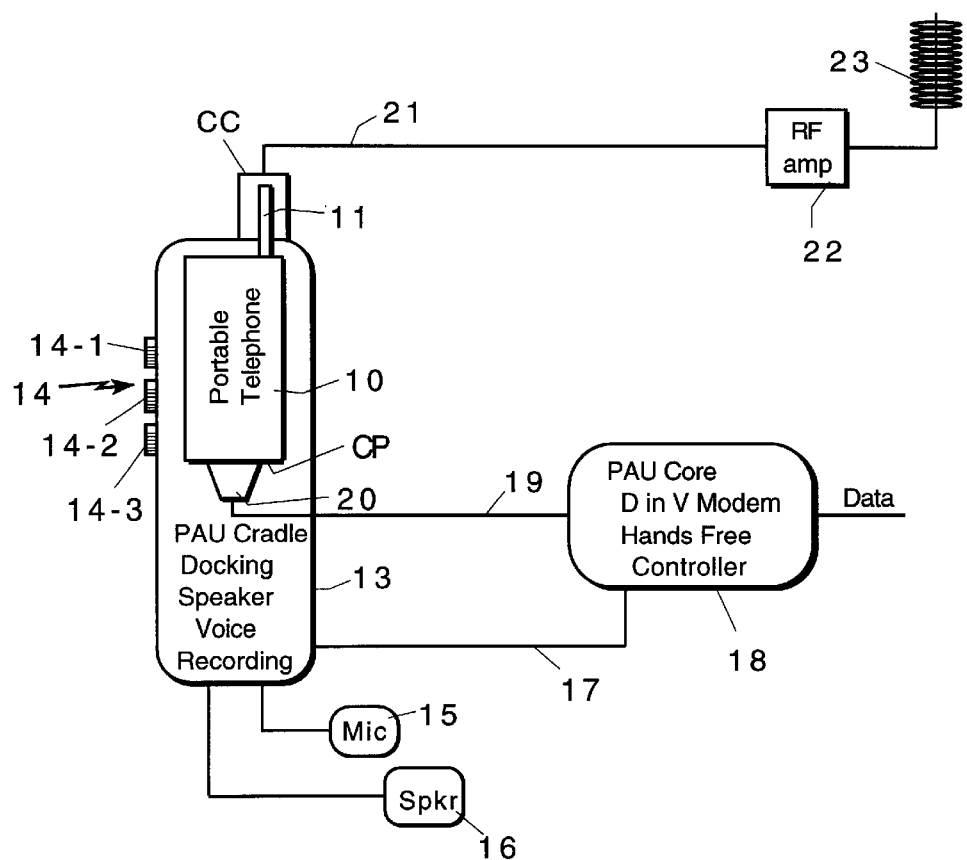
FIG. 2a is a block diagram illustrating a portable applique unit (PAU) with a data-in-voice modem for portable telephones in vehicles with capacitive coupling and RF amplification with the portable telephone's antenna.
Figure 2B:
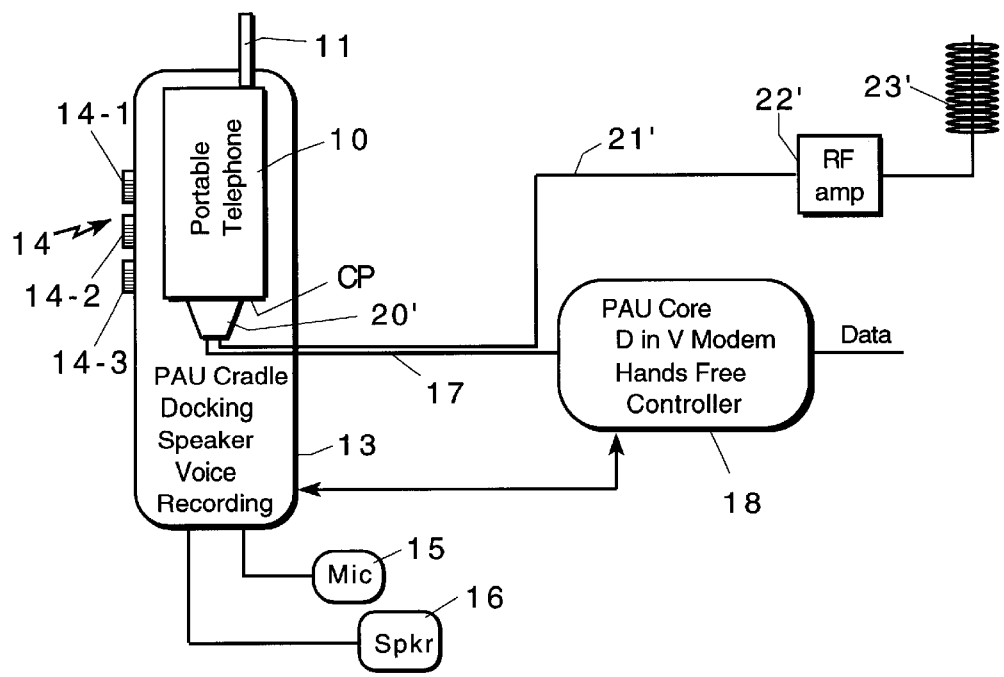
FIG. 2b is a similar illustration showing an RF coaxial cable connector to the portable telephone connector.

FIGS. 2a and 2b illustrate the configuration of this accessory with typical portable phones. In FIG. 2a, the configuration is shown where the portable 10 does not have an RF output at its connector port CP, and a capacitive coupling device CC is used to tap the signal of the portable antenna 11. In this case, the portable handset 10 is mounted on the portable applique unit (PAU) cradle 13 (functionally of the type disclosed in Ser. No. 08/288,764 having control buttons 14 for the voice recorder "REC"14-1, "Play/Pause"14-2, "REW/Stop" 14-3, for example), microphone 15 and speaker 16. Microphone 15 is used to input voice signals to the portable phone 10 and speaker 16 emits amplified voice signals received over the cellular telephone line or from the recorder in cradle 13. In this embodiment, the docking cradle 13 for the portable has a voice or audio line 14 which is connected to the PAU core unit 18 which, in turn, contains the data-in-voice modem (FIG. 4) and the hands-free circuit described later herein. The audio lines 19 of the phone bus is connected via connector 20 to the cellular telephone port CP as described later.

In FIG. 2a, a capacitive coupler CC is removably fitted on or over the cellular antenna 11 and an RF coax line 21 couples the signal to a small RF amplifier 22 which boosts the signal to the normal limit (currently about 0.6 watts) for transmission to a cellular antenna 23. Thus, the cellular telephone has been adapted to operate in hands-free manner and at the same time, it has been adapted to operate in conjunction with the data-in-voice modem to receive and transmit data.

In FIG. 2b, the configuration is shown where the connector port CP of the portable contains the RF signal and a RF coax line 21' couples the RF signal to and from optional RF amplifier 22' to cellular antenna 23' (which if vehicle mounted may be on the exterior of the vehicle). As indicated in FIGS. 2a and 2b, this accessory device invention will be referred to as the Portable Applique Unit (PAU) 18 and consists of the following components:

PAU Core (18)

This is the universal device that supports data-in-voice modem (FIG. 4) hands-free operation and control for any portable telephone that has the appropriate connector port (such as connector port CP) which can vary for different phone models with appropriate changes in the connector 20, 20').

PAU Cradle

The docking unit for the portable that supports mechanical docking, hands-free speaker, as well as an add-on option for voice recording with record/playback control buttons 14 for a wide variety of portable phones with the appropriate connector port and form factor. This cradle also supports the hands-free microphone and an option external speaker.

PAU Amplifier 12

The device that gives the portable's RF output a boost back to 0.6 watts (nominal) to make up for losses in the RF coax and RF connectors. This device is optional.

PAU Connector 20, 21

A device that is specific to each portable and connects to the portable's port CP and provides for level conversion to/from the PAU Core.

PAU Applications and Accessory Equipment

Figure 3:
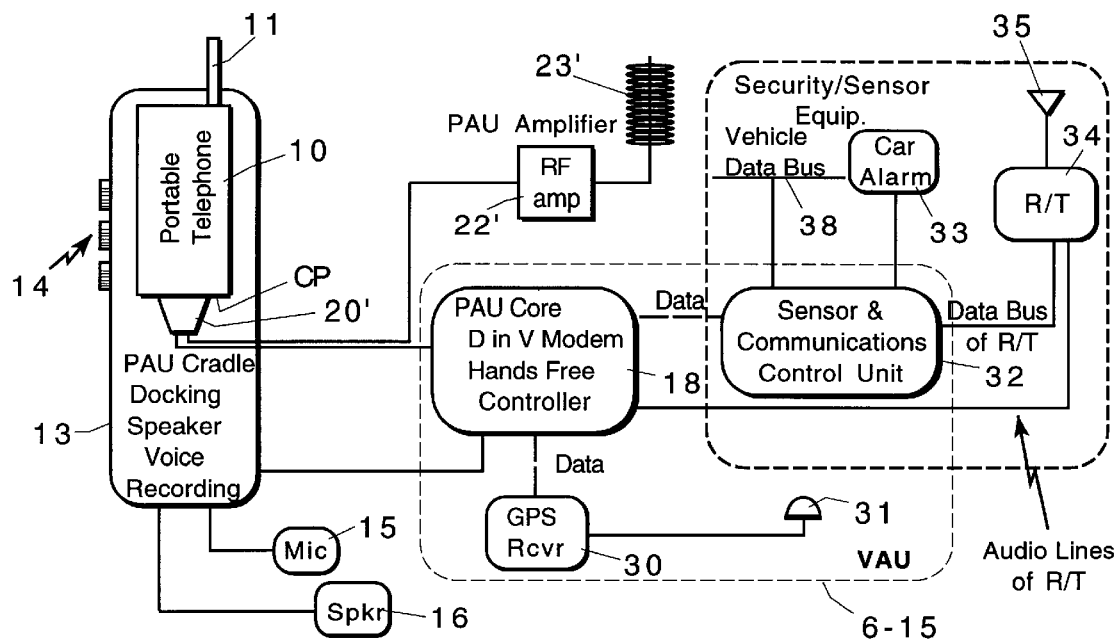
FIG. 3 is a block diagram of a portable applique unit (PAU) with GPS position receive and security/sensor equipment, the total suite comprising the vehicular applique unit (VAU)

Because the PAU supports the simultaneous transfer of data and voice, with the appropriate data interfaces it can report the position of the portable for calls dialed from the portable. FIG. 3 shows the PAU with a suite of equipment that is applicable to the use of portable in a vehicle. The PAU equipment suite includes:

a GPS Receiver 30 and GPS Antenna 31
a Sensor and Communications Control Unit (SCCU) 32
a Car Alarm 33
a Cellular Mobile Transceiver 34
GPS Positioning & Reporting The PAU has a data interface to GPS receiver 30 and antenna 31 so that calls dialed from the portable 10 can report the position of the vehicle simultaneously with the voice conversation. Thus with the GPS receiver 30 or other positioning device, the PAU can support the Position Enhanced Cellular Services (PECS) as defined in the above referenced related application. In such a vehicular installation, the PAU Core 18, the PAU Cradle 13, and the GPS receiver/antenna 30, 31 would be permanently installed in the vehicle.

The equipment group consisting of the PAU core, the GPS receiver/antenna, and the SCCU may be combined in a single unit. In such a case, it is referred to as the vehicular applique unit (VAU).

Security and Sensor Equipment

The GPS receiver 30 and PAU 18 present an opportunity to support vehicular security and monitoring with additional accessory equipment as illustrated in FIG. 3. Such security equipment includes:

a cellular transceiver (R/T) 34 with a hidden antenna 35 that provides a communications pipe to the outside world even when the portable is not in position. The R/T 34 would have its own unique phone number and ESN apart from the portable 10.

a Sensor & Communications Control Unit (SCCU) 32.

Specialized sensor inputs from devices such as a car alarm 33, or standard vehicular data busses 38 for diagnostics and monitoring (e.g., the J1850 Standard by the Society of Automotive Engineers - SAE).

The Sensor & Communications Control Unit 32 has the following functions:

collect sensor information from the car alarm 33 and from the vehicular data bus 38.

distribute commands to the car alarm 33 and to other sensors (via the vehicular data bus).

control of the R/T 34 so as to initiate/terminate calls in response to defined sensor input conditions.

duplex data interface with the PAU Core 18.

Thus a vehicle equipped with a PAU Core 18 in combination with the suite of security/sensor equipment pictured in FIG. 3 would thus support the collection information on the vehicle state, and could transfer this information to an external platform via the cellular R/T.

PAU Configuration and Operation

FIG. 3 shows the logical configuration of the PAU Core 18. The PAU 18 has four basic operational states. Two of the states relate to the portable phone 10 and two relate to the mobile transceiver 34 that is permanently installed in the vehicle as part of the security equipment. The 4 operating states are as follows:

1. PAU Operation in the Ready State with a Portable phone.

2. PAU Operation in the Data-in-Voice State with a Portable Phone.

3. Operation in the Ready State with the Vehicle's Mobile Transceiver.

4. Operation in the Data-in-Voice State with the Vehicle's Mobile Transceiver.

PAU Operation in the Ready State with a Portable Phone

Figure 4:
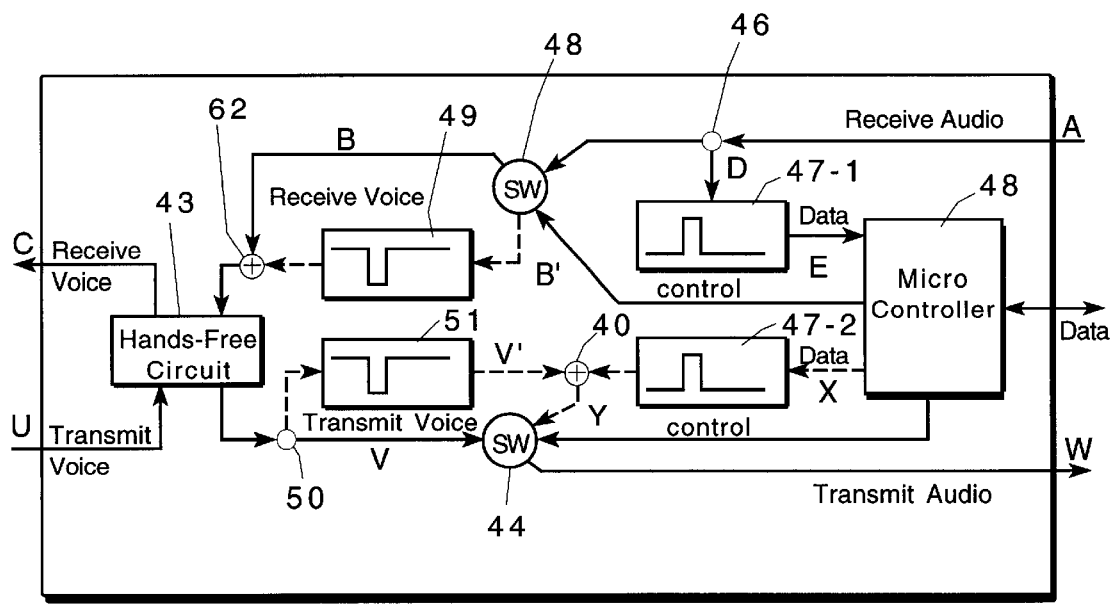
FIG. 4 is a block diagram illustrating a preferred embodiment of data-in-voice modem and operation thereof.

Referring to FIG. 4, in the ready state, the PAU simply provides hands-free operation to the portable via the speaker,(in the cradle 13 or the external speaker 16) and the microphone 15 so that the received audio follows the solid path from A, through the two solid-state switches 40, 41 to the solid path B, summer 62, through the hands-free circuit 43, and finally to the speaker along path C. Similarly, the transmit voice follows the path along U from the microphone, through the hands-free circuit 43 to solid path V, and then via the electronic switch 44 and power divider 45 to the portable via path W. Thus in the PAU ready state, the receive and transmit voice are relayed without any alteration, except for the hands-free processing. However, in the ready state, the PAU is also continuously processing the incoming audio channel (the path from point A; to path D to path E) in search of a unique data signature (about 5 bytes in length) from a cooperating data-in-voice modem at the other end of the conversation. This data path is formed by power dividing at 46, the incoming audio channel A into a voice path VP and a data path D. The data path D of the incoming audio channel is bandpass filtered and demodulated in 47-1, thereby extracting a data signal E. The extracted data is then transported to the controller 48 for interpretation and coupling to an external data path.

PAU Operation in the Data-in-Voice State with a Portable Phone

When the controller recognizes the unique data signature within the incoming audio channel, the controller configures the PAU 18 in the data-in-voice state in which voice and data travel the dotted paths illustrated in FIG. 4. The receive voice travels from point A to path B to point C. On path B, there is a notch filter 49 (or band suppression filter), which complements the data bandpass filter 47-1. This filter 49 attenuates a portion of the audio channel, and thereby filters out the incoming data so that it is not audible in the vehicle cellular telephone. At the same time, the controller 48 also modifies the transmit audio. It configures the transmit voice to travel from point U, through the hands-free circuit 43; power divider 50 to path V and filter 51, and then to path W, via switch 44, and divider 45, toward the transmit audio of the portable 10. The transmit audio also incorporates a data channel which originates at point X, and is added to the voice path (V). In the data-in-voice state, the PAU 18 supports hands-free operation of the portable 10 and the insertion of a data channel within the audio so that data and voice are simultaneously supported.

PAU Operation in the Ready State with the Mobile Transceiver

When the PAU 18 is operating with the mobile transceiver 34, the input Al from the portable's received audio signal and the output W to the portable's transmit channel are blocked: all voice and data signals that pass via the PAU 18 are transmitted and received via the mobile transceiver 34 in the vehicle. In the ready state, voice received from the hands-free microphone 15 at point U, passes through the hands-free circuitry 43, and then is routed over path V, through the switch 44 and the out to the transmit audio W path of the mobile transceiver. In the PAU 18 ready state, the receiver and transmit voice are relayed without any alteration, except for the hands-free processing. However, in the ready state, the PAU 18 is also continuously monitoring and processing the incoming audio channel (the path from point A to path D to path E) in search of a unique data signature (about 5 bytes in length) from a cooperating data-in-voice modem at the other end of the conversation. This data path is formed by power dividing at 46 the incoming audio channel A into a voice path VP and a data path D. The date path D of the incoming audio channel is bandpass filtered and demodulated 47-1 thereby extracting a data signal E. The extracted data is then transported to the controller 48 for interpretation.

PAU Operation in the Data-in-Voice State with the Mobile Transceiver

When the controller 48 recognizes the unique data signature within the incoming audio channel, the controller 48 configures the PAU 18 in the data-in-voice state in which voice and data travel the dotted paths illustrated in FIG. 4. The receive voice travels from point A to path B to point C. On path B, there is a notch filter 49 (or band suppression filter), which complements the data bandpass filter. This filter subtracts a portion of the audio channel, and thereby filters out the incoming data so that it is not audible in the vehicle cellular telephone. At the same time, the controller 48 also modifies the transmit audio. It configures the transmit voice to travel from point U, through the hands-free circuit 43 to path V, and then to point W to the transmit audio of the mobile transceiver. The transmit audio also incorporates a data channel which originates at point X, and is summed or added 60 to the voice path (V). In the data-in-voice state, the PAU supports hands-free operation with the mobile transceiver, and the insertion of a data channel within the audio so that data and voice are simultaneously supported.

Figure 5:
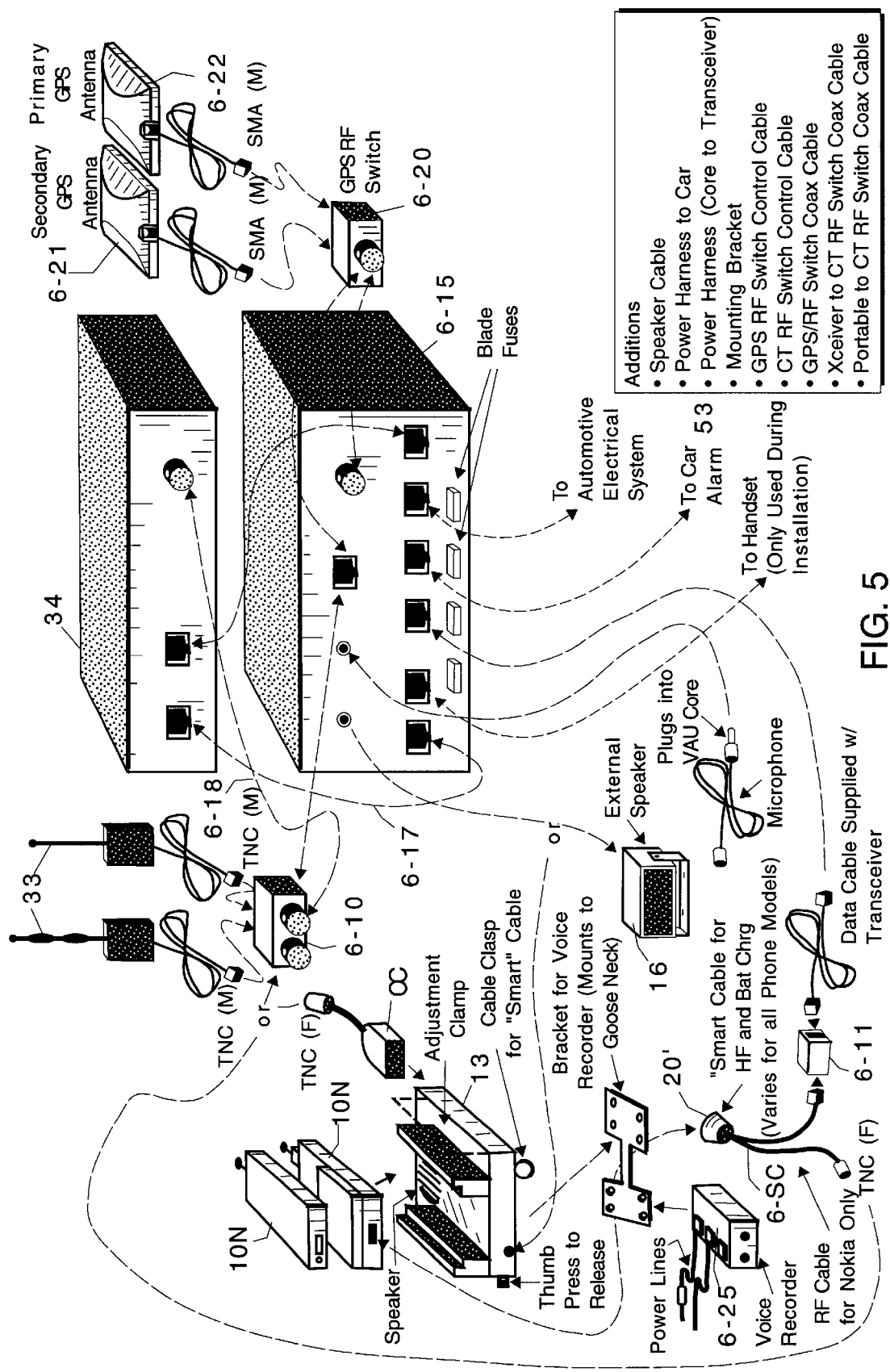
FIG. 5 is an explanatory overview of the family of portable telephone products accommodated with the invention.

In FIG. 5, the various components, several of which are optional, are diagrammatically illustrated with explanatory legends for alternative optional equipment additions and system configurations. For example, the system on a vehicle may be provided with a selectable cellular antenna, labeled "primary" and "secondary", which are selectable by a switch 6–10. In the alternative, depending on the portable model 10N, 10M, etc., antenna coupler CC (Motorolla 10-M) slips over the antenna 11 (FIG. 2*a*), or a "smart" cable 6-SC having a plug 20' with an RF cable (Nokia ION) may be used. A coupling is made via coupler 611 to a data cable which couples to the VAU core 6–15 which basically includes the designated components shown in FIG. 3 within the 6–15 box. Vehicle transceiver 34 is connected to the VAU core by modular connectors and cables 6–17 and antenna switch 6–10 by a coax cable 6–18. An RF switch 6–20 selects one of the GPS antennas 6–21, 6–22 for use by the GPS position receiver 30 (FIG. 3). The VAU core 6–15 receives power from the vehicle or automotive electrical system and which may be chained to the vehicle cellular transceiver 34. In FIG. 5, the voice recorder 6–25 is illustrated as a separate component.

The invention is characterized by the following novel features:

1) The use of a PAU Core that supports a "data-in-voice" channel for portable phones.
2) The fact that the above "data-in-voice" channel is provided as a universal solution for all portables since it does not rely on interfacing with the portable data bus.
3) The combination of the "data-in-voice" function and the hands-free function in a single unit.
4) The use of a cradle with voice recorder in combination with the PAU or other unit that provides a hands-free capability for portable phones.
5) The use of the PAU Core and GPS Receiver to provide position-enhanced cellular services via the portable phone (i.e., provide the location of the caller embedded within the audio channel).
6) The use of the PAU to support the "data-in-voice" channel of either the portable cellular phone or an additional cellular phone that is dedicated to the vehicle (i.e., permanently mounted in the vehicle).
7) The fact that the PAU and the SCCU coordinate and decide whether to serve the portable or the vehicle transceiver with the data-in-voice channel and the associated embedded data services.
8) The use of the PAU in combination with the Sensor and Communications Control Unit to provide sensor information from Car Alarm, etc. over the "date-in-voice" channel. This may support the portable telephone or the cellular R/T that is dedicated to the vehicle.
9) The fact that the SCCU has an interface with the vehicular monitoring and diagnostic data bus and an interface with the cellular R/T so as to provide a communications bridge between all of the devices that are attached to the vehicular bus, and an external interrogator that is connected via the data channel supported by the R/T, PAU and SCCU.

While preferred embodiments of the invention have been shown and described, it will be appreciated that various modifications and adaptations of the invention will be readily apparent to those skilled in the art and such modifications and adaptations are intended to be encompassed within the spirit and scope of the invention.

What is claimed is:

1. A cellular telephone accessory system for simultaneously incorporating data and voice within a single voice channel of a portable cellular telephone having an accessible phone bus, comprising:
   1) cradle means for receiving said portable cellular telephone and having a microphone interface and speaker interfaces,
   2) a core unit having a data-in-voice modem for receiving and transmitting voice and data signals simultaneously in said single voice channel when said cellular telephone is in said cradle, a micro controller, switch means controlled by said micro controller for controlling data and voice signals to and from said modem on said single voice channel, and a hands-free controller circuit for sensing presence of said portable cellular telephone in said cradle,
   3) connector means for:
      1) a supplemental antenna and means of coupling RF signals from said portable cellular telephone to said supplemental antenna,
      2) coupling audio lines of said telephone bus to said data-in-voice modem in said core unit, and
   4) a voice line controlled by said hands-free circuit for connecting said microphone and speaker to said core unit.

2. The cellular telephone accessory system defined in claim 1 including a position sensing receiver for RF signals broadcast from plural directions and determining the geographical position of said cradle means and means connecting said position sensing receiver to said data-in-voice modem and transmitting said geographical position to a central station.

3. The cellular telephone system defined in claim 1 including one or more car alarm devices for producing alarm signals and means coupling said one or more alarm signals to said data-in-voice modem through said micro controller for transmission over said voice channel without interfering with voice transmissions on said voice channel, and also a return path for the car alarm for control and configuration thereof.

4. The cellular telephone accessory system defined in claim 1 mounted in a vehicle and including a cellular receiver/transmitter unit having a unit number and call number assigned thereto, and a further cellular antenna, and a data bus coupling said receiver/transmitter unit to said data-in-voice modem through said micro controller.

5. The cellular telephone accessory defined in claim 1 including RF booster amplifier means in said means coupling RF signals.

6. The cellular telephone accessory system defined in claim 1 wherein said data-in-voice modem includes a notch filter to attenuate a portion of the audio channel and thereby filter out any incoming data signals so they are not audible in the cellular telephone, said switch means being controlled by said micro controller to bypass said notch filter in the absence of data.

7. An accessory device for portable telephones, comprising:
   a cradle for receiving the portable telephone and hands-free microphone and speaker, means for enabling hands-free conversations by the user over a cellular voice channel, and a data-in-voice modem, a micro controller, switch means controlled by said micro controller for embedding data in said voice channel simultaneously with a user conversation.

8. The accessory device defined in claim 4 including receiver means to receive RF broadcasts from a plurality of directions and derive therefrom a position information signal said micro controller being connected to receive and couple said position information signal to said modem for transmission to a central station.

9. In a cellular telephone unit having a voice channel carried in a vehicle, said vehicle having a plurality of vehicle condition sensors and a vehicle data bus for coupling signals from said sensors to a vehicle on-board computer, a data-in-voice modem connected to said cellular telephone unit, micro controller means, switch means controlled by said micro controller for coupling signals from said vehicle condition sensors to said data in voice modem for transmitting on said voice channel to a central station.

10. The cellular telephone accessory system defined in claim 1 wherein said hands-free controller circuit is implemented in software as part of the overall filtering and modulation/demodulation process of said data-in-voice modem.

* * * * *